Sept. 21, 1937.  C. A. MANN  2,093,814
METHOD AND APPARATUS FOR BRAZING
Filed Sept. 29, 1934  2 Sheets-Sheet 1
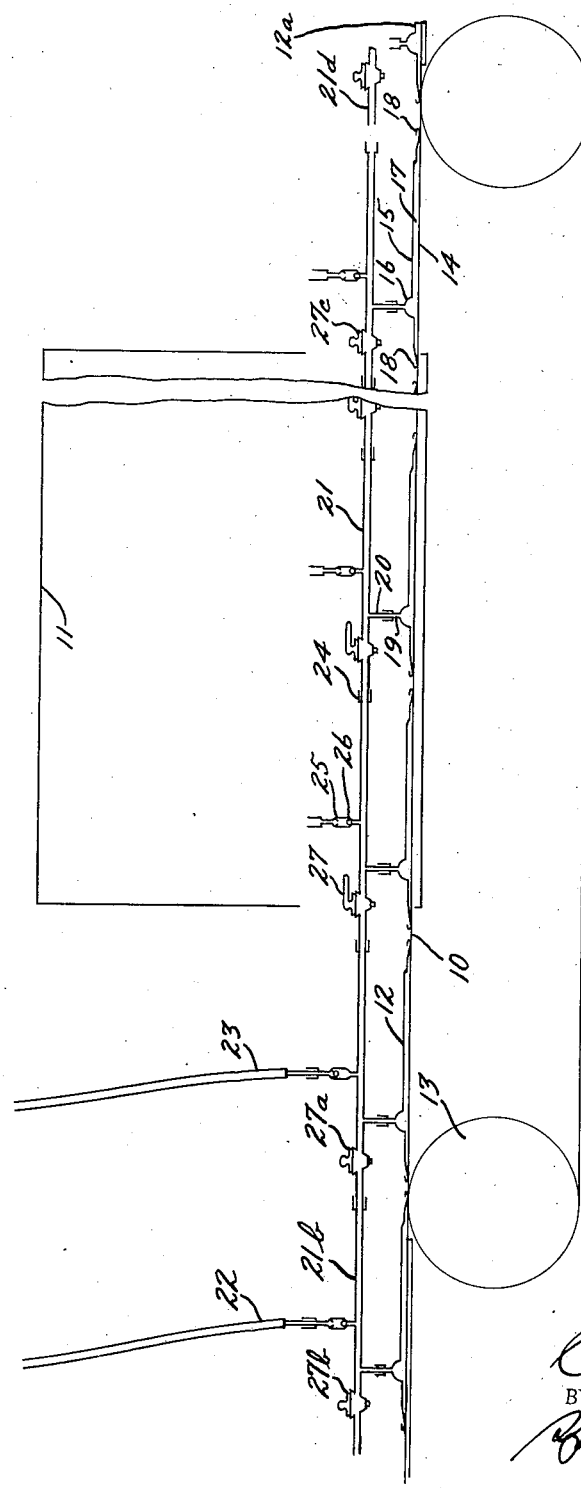

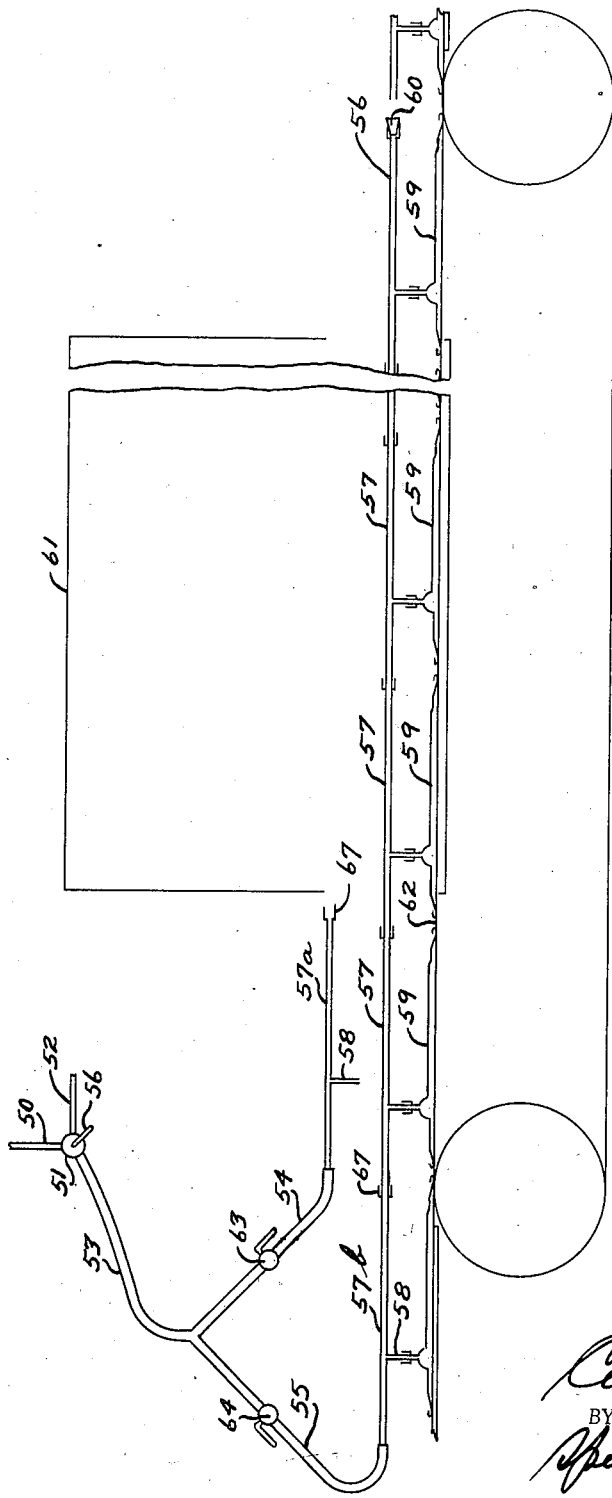

Patented Sept. 21, 1937

2,093,814

UNITED STATES PATENT OFFICE 2,093,814

METHOD AND APPARATUS FOR BRAZING

Cecil A. Mann, Dayton, Ohio, assignor to General Motors Corporation, Dayton, Ohio, a corporation of Delaware Application September 29, 1934, Serial No. 746,214

9 Claims. (Cl. 113—59)

This invention relates to refrigeration and like industries.

It is an object of this invention to provide a method and apparatus for brazing evaporators, condensers and similar devices by continuously maintaining a partial vacuum or sub-atmospheric pressure within the objects while they are traveling through the brazing furnace.

Further objects and advantages of the present invention will be apparent from the following description, reference being had to the accompanying drawings, wherein a preferred form of the present invention is clearly shown.

In the drawings:

Fig. 1 is a diagrammatic representation of the embodiment now preferred;

Fig. 2 is a modification thereof; and

Fig. 3 is a further modification thereof.

In practicing my invention a conveyor 10 travels continuously through the brazing furnace diagrammatically indicated at 11. This furnace may be of the type in which a controlled atmosphere is maintained, if desired, this atmosphere being preferably a reducing atmosphere such as hydrogen, or a mixture of inert and reducing gases. The interior of the furnace is however, at atmospheric pressure. Evaporators 12, which are to be brazed in the furnace, are placed on the conveyor 10 near its end 13. These evaporators, condensers or the like may be of any desired shape. One form of evaporator which is adapted for my invention may be made of two sheets 14 and 15, the sheet being bent to form a header 16 and longitudinally spaced ducts 17. The edges 18 of the plate 14 are bent around the edges of the plate 15 before the brazing operation. Before the two sheets 14 and 15 are assembled together a thin sheet of bonding agent, such as brass spelter, is placed between them. The sheets 14 and 15 may be of any desired metal or alloy and, for example, may be a brass containing 85% copper and 15% zinc. The brass spelter sheet may contain, for example, 60% copper and substantially 40% zinc with .12%–.24% phosphorus. It is desirable to force the sheets of metal comprising each of the evaporators toward one another during the process of heating the evaporator to cause melting of the spelter and binding of the contacting parts of the sheets together. In other words, provision must be made to insure that the parts of the metal sheets of the evaporator to be secured together are maintained in contact with one another during heating of the evaporator and in the present invention I maintain a vacuum in header 16 and passages 17 provided between the metal sheets 14 and 15. As the evaporators travel through the furnace they finally reach a temperature of 1800° F. and are thereafter cooled in the reducing atmosphere in a manner well known in the art. It is apparent that the progressive traveling of the evaporators through the furnace causes the entire surfaces thereof exposed to the heat generated within the furnace to be simultaneously and uniformly heated.

In order to maintain a partial vacuum continuously within the evaporators, the evaporators are provided with nipples 19 which may be connected by slip-joints with the nipples 20 of the vacuum tube sections 21. These vacuum tube sections 21 are assembled together as the evaporators are conveyed into the furnace and are consecutively connected to suction tubes 22 and 23 in a manner hereafter described. The sections 21 are provided with end joints 24 of any type which are easily assembled together. They may be slip-joints, threaded joints or any other convenient type of joints. The sections are also provided with nipples 25 having a check valve 26 of such a character that they permit the flow of air upwardly, but prevent any substantial flow of air downwardly into the tubes. The sections 21 are also provided with valves 27 which may be of any type which may be easily knocked apart if they become bound and conveniently may be provided with handles, hexagonal heads or the like for opening and closing them. As shown in the drawings, the valve indicated at 27a is still closed after the section 21b has already been assembled in line, the suction tube 22 also having been assembled and the valve 27b being closed. The operator can now open the valve 27a and disconnect the suction tube 23 so that the tube 23 will then be ready to be assembled to the next section 21 as the work progresses into the furnace. The suction tubes 22 and 23 are connected to a vacuum pump of suitable capacity, and are provided with valves, not shown, for closing the tubes while they are being transferred from one section 21 to another.

As the work leaves the furnace, the valve 27c is closed just before the section 21d is disconnected from the line. The section 21d can then be disconnected from its corresponding evaporator 12a for reuse in the furnace It is to be understood that the sections 21 together with their valves and fittings are to be made of suitable alloys capable of resisting temperatures to be encountered within the furnace.

Such alloys are well known and are therefore not specifically enumerated.

The partial vacuum which is thus produced within the evaporators, condensers or the like tends to bring the edges of the sheets 14 and 15 together and insures proper bonding at these points and any other intermediate points such as along the edges of the conduits 17. After the evaporators have been thus brazed they may be bent to the desired shape to accommodate freezing trays when they are assembled in the refrigerators as disclosed in the copending application of Sylvester M. Schweller, Serial No. 727,942, filed May 28, 1934.

In the modification shown in Fig. 2, the conveyor 30 leads to a furnace similar to that shown in Fig. 1. One or more evaporators 31 are fed into the furnace by the conveyor. A long tube 32 is attached to evaporator, the tube being longer than the furnace so that its end 33 remains outside the furnace when the evaporator emerges in a brazed condition from the other end of the furnace. The tube is then retracted for use with another evaporator. As many tubes as required may be provided, so that a tube is available for each evaporator which is in the furnace. Thus a plurality of evaporators may be fed at one time through the furnace.

The tube 32 is secured at end 33 to a flexible suction tube 34, provided with a valve 35. The valve may be closed while the evaporator is being attached to the tube, and the valve may be opened and closed as desired to impart a partial vacuum within the evaporator throughout its travel through the furnace or through any partial travel thereof. Thus the vacuum need not be imparted until after the evaporator has traveled part way into the furnace, and the suction may be cut off even before the evaporator emerges from the furnace.

A further modification is shown in Fig. 3. It may sometimes be permissible or desirable to impart an intermittent vacuum on the evaporators as they travel through the furnace. When this is the case, the manual valves and check valve connections shown in Fig. 1 may be omitted. A suction line 50 leads to a two-way valve 51 where a reducing gas line 52 also connects. The reducing gas in 52 may be substantially at atmospheric pressure. The valve 51 is connected to a flexible line 53 having branches 54 and 55. The handle 56 of the valve 51 may be turned to connect either the suction line 50 or the reducing gas line 52 to the line 53. Vacuum tube sections 57 may be connected to each other by bayonet joints 67 and by nipples 58 to the evaporators 59. At the emerging end a plug 60 may be inserted into the last connected section 57 as the sections are disconnected from the line. By this construction it is possible to impart intermittent vacuum to the evaporators as they progress through the furnace 61 on the conveyor 62 and, if desired, to introduce alternately a reducing or other gas into the evaporators.

In the operation of Fig. 3, the section 57a is connected to the branch flexible line 54 before the branch 55 is disconnected from the section 57b. The valve 63 in the branch 54 is closed and the handle 56 is turned so that reducing gas can rush in from the line 52 past the valve 51 and into the sections 57 in the furnace 61. Then the branch 55 is quickly removed from the section 57b and the section 57a is joined onto the section 57b while the handle 56 is turned to connect the line 50. The valve 63 is opened then to impart a vacuum again on the sections 56 in the furnace and within the evaporators 59. The valve 64 in branch 55 is of course closed as soon as that branch is disconnected. A new section 56 is then joined to the branch 55 in readiness for the next evaporator, when the operation is repeated.

By this construction intermittent vacuum is imparted to the evaporators and this is an advantage in that it tends to prevent the formation of blow-holes in the brazing operation between the sheets of the evaporators, since the spelter tends to form fillets in such holes when the vacuum is broken. The reducing gas which is alternated with the vacuum prevents air from rushing in and oxidizing the surfaces when the vacuum is broken.

The invention herein disclosed is applicable to many other articles than evaporators, and it is to be understood that whenever evaporators are specifically mentioned herein the word is used to designate an example of a product and is therefore generic in its character. Condensers, radiators and other hollow articles, therefore, may be produced by my process and are understood to come within the scope of my invention.

While the form of embodiment of the invention as herein disclosed, constitutes a preferred form, it is to be understood that other forms might be adopted, all coming within the scope of the claims which follow.

What is claimed is as follows:

1. The method of brazing articles made of a plurality of metal sheets which comprises, preliminarily assembling the sheets with bonding material, continuously feeding said articles through a brazing furnace to uniformly heat the entire exposed surfaces of the articles to a brazing temperature in atmospheric pressure and maintaining a partial vacuum within the articles as they travel through the furnace.

2. A brazing apparatus comprising a brazing furnace, feeding mechanism for feeding articles to be brazed through said furnace to uniformly heat the entire exposed surfaces of the articles to a brazing temperature, and means for maintaining a vacuum within said articles as they travel through the furnace exposed to atmospheric pressure upon the exterior of said articles.

3. A brazing apparatus comprising a brazing furnace, feeding mechanism for feeding articles to be brazed through said furnace to uniformly heat the entire exposed surfaces of the articles to a brazing temperature, and means for maintaining a vacuum within said articles as they travel through the furnace exposed to atmospheric pressure upon the exterior of said articles, said means including piping connecting several articles within the furnace.

4. A brazing apparatus comprising a brazing furnace, feeding mechanism for feeding articles to be brazed through said furnace to uniformly heat the entire exposed surfaces of the articles to a brazing temperature, and means for maintaining a vacuum within said articles as they travel through the furnace exposed to atmospheric pressure upon the exterior of said articles, said means including pipe sections provided with means for connecting said sections together, to the articles to be brazed and to a suction device.

5. A brazing apparatus comprising a brazing furnace, feeding mechanism for feeding articles to be brazed through said furnace to uniformly heat the entire exposed surfaces of the articles to a brazing temperature, and means for maintaining a vacuum within said articles as they travel through the furnace exposed to atmospheric pressure upon the exterior of said articles, said means including pipe sections provided with means for connecting said sections together, to the articles to be brazed and to a suction device, and a valve in said each of said sections.

6. The method of brazing articles made of a plurality of metal sheets which comprises, preliminarily assembling the sheets with a bonding material, continuously feeding said articles through a brazing furnace to uniformly heat the entire exposed surfaces of the articles in atmospheric pressure to a brazing temperature and imparting a partial vacuum within the articles as they travel through the furnace.

7. The method of brazing articles made of a plurality of metal sheets which comprises, preliminarily assembling the sheets with a bonding material, continuously feeding said articles through a brazing furnace to uniformly heat the entire exposed surfaces of the articles in atmospheric pressure to a brazing temperature and imparting an intermittent partial vacuum within the articles as they travel through the furnace.

8. The method of brazing articles made of a plurality of metal sheets which comprises, preliminarily assembling the sheets with a bonding material, continuously feeding said articles through a brazing furnace to uniformly heat the entire exposed surfaces of the articles in atmospheric pressure to a brazing temperature and imparting alternately a partial vacuum and introducing a gas within the articles as they travel through the furnace.

9. The method of brazing articles made of a plurality of metal sheets which comprises, preliminarily assembling the sheets by superimposing one upon another with a sheet of bonding material therebetween, continuously feeding said articles through a brazing furnace to uniformly heat the entire exposed surfaces of the article to a brazing temperature in atmospheric pressure and maintaining a partial vacuum within the articles as they travel through the furnace.

CECIL A. MANN.